United States Patent
Inatani

(10) Patent No.: US 11,170,539 B2
(45) Date of Patent: Nov. 9, 2021

(54) INFORMATION PROCESSING DEVICE AND INFORMATION PROCESSING METHOD

(71) Applicant: SONY CORPORATION, Tokyo (JP)

(72) Inventor: Soichiro Inatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/766,484

(22) PCT Filed: Oct. 29, 2018

(86) PCT No.: PCT/JP2018/040071
§ 371 (c)(1),
(2) Date: May 22, 2020

(87) PCT Pub. No.: WO2019/107040
PCT Pub. Date: Jun. 6, 2019

(65) Prior Publication Data
US 2020/0380733 A1 Dec. 3, 2020

(30) Foreign Application Priority Data

Dec. 1, 2017 (JP) .............................. JP2017-231960

(51) Int. Cl.
*G06T 11/00* (2006.01)
*G06F 3/01* (2006.01)
*G06F 3/16* (2006.01)

(52) U.S. Cl.
CPC .............. *G06T 11/00* (2013.01); *G06F 3/011* (2013.01); *G06F 3/017* (2013.01); *G06F 3/167* (2013.01)

(58) Field of Classification Search
CPC .......... G06F 2111/18; G06F 3/011–015; G06F 3/0481; G06F 3/04817; G06F 9/4443; G06F 3/04847; G06F 11/3664; G06F 3/012; G06F 3/0304; G06K 9/00664–00704; G06T 19/00; G06T 17/00; G06T 7/00;
(Continued)

(56) References Cited

U.S. PATENT DOCUMENTS

2013/0227496 A1* 8/2013 Maekawa ........... G06F 3/04847
715/863
2014/0098137 A1* 4/2014 Fein ........................ G06T 11/60
345/633
(Continued)

FOREIGN PATENT DOCUMENTS

CN 104685857 A 6/2015
JP 2014-071811 A 4/2014
(Continued)

OTHER PUBLICATIONS

International Search Report and Written Opinion of PCT Application No. PCT/JP2018/040071, dated Dec. 11, 2018, 06 pages of ISRWO.

*Primary Examiner* — Todd Buttram
(74) *Attorney, Agent, or Firm* — Chip Law Group

(57) ABSTRACT

A display control unit that controls presence or absence of a display item on a display unit based on a display order of display items determined according to environment information or user information, by using a change in behavior of a user as a trigger is provided, such that an influence of the display item on a view of the user is reduced and the user can comfortably experience an AR superimposition technology.

21 Claims, 12 Drawing Sheets

(58) Field of Classification Search
CPC ... G06T 19/006; G06T 2215/16; H04N 5/272; H04N 2201/3245; A63F 13/10
See application file for complete search history.

(56) References Cited

U.S. PATENT DOCUMENTS

2015/0153570 A1    6/2015  Yamamoto et al.
2018/0260726 A1*   9/2018  Takada .................. G06N 7/005

FOREIGN PATENT DOCUMENTS

| JP | 2017-174018 A | 9/2017 |
| JP | 2017-211916 A | 11/2017 |
| WO | 2014/054210 A2 | 4/2014 |

* cited by examiner

FIG.7
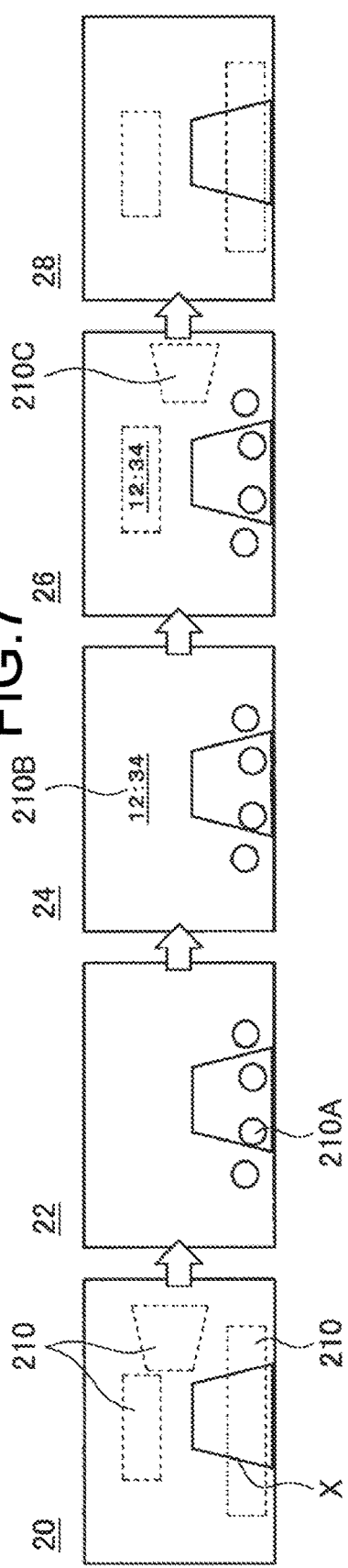
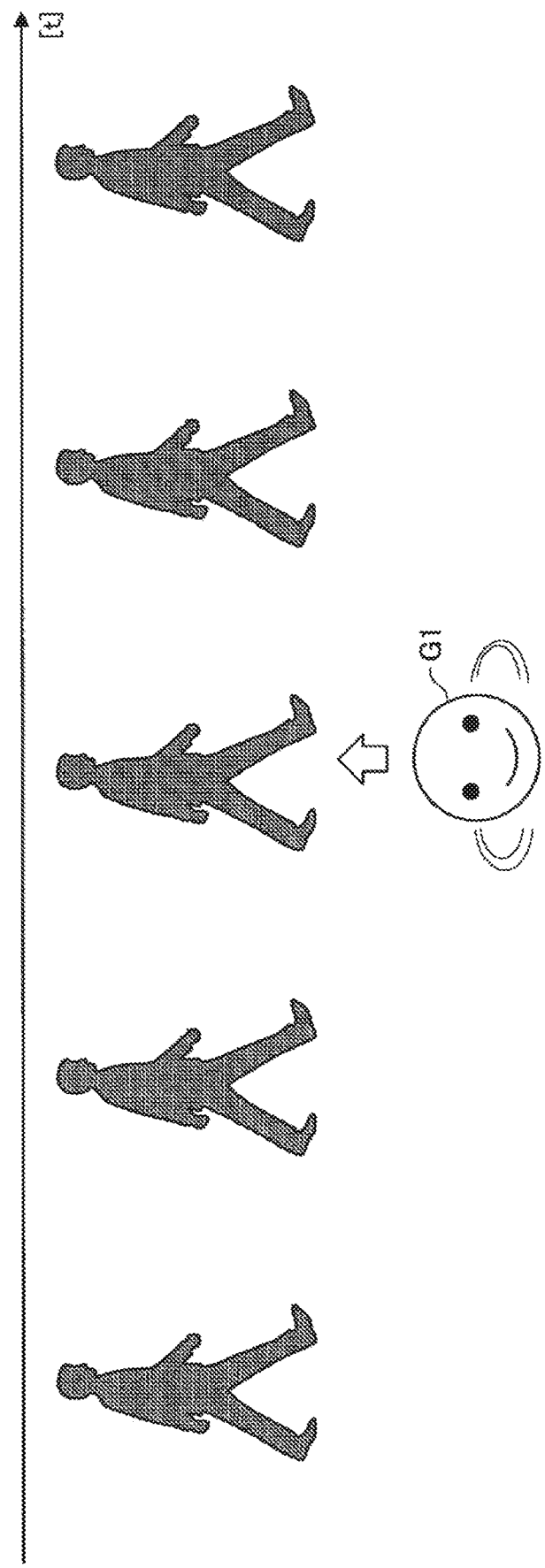

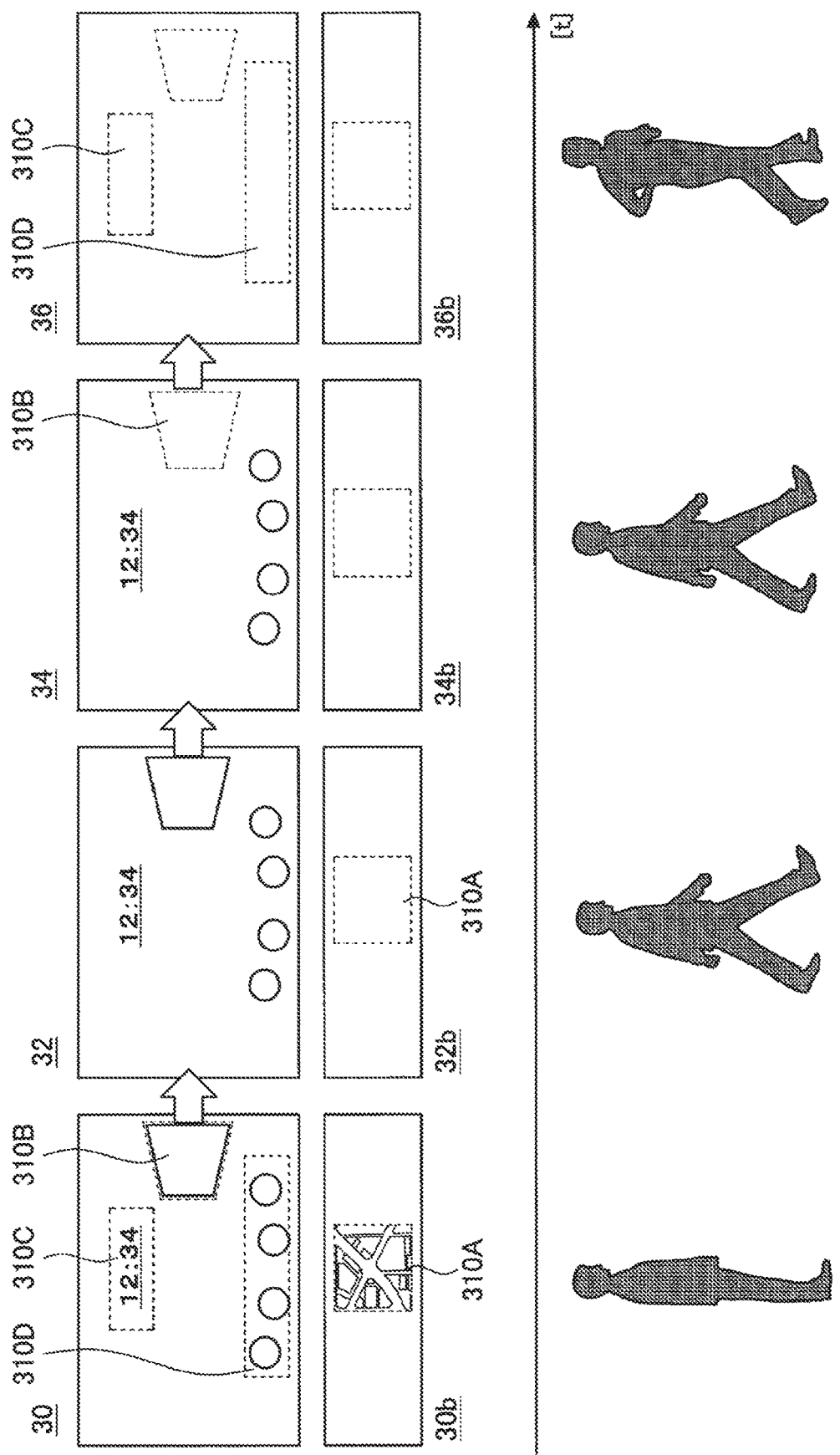

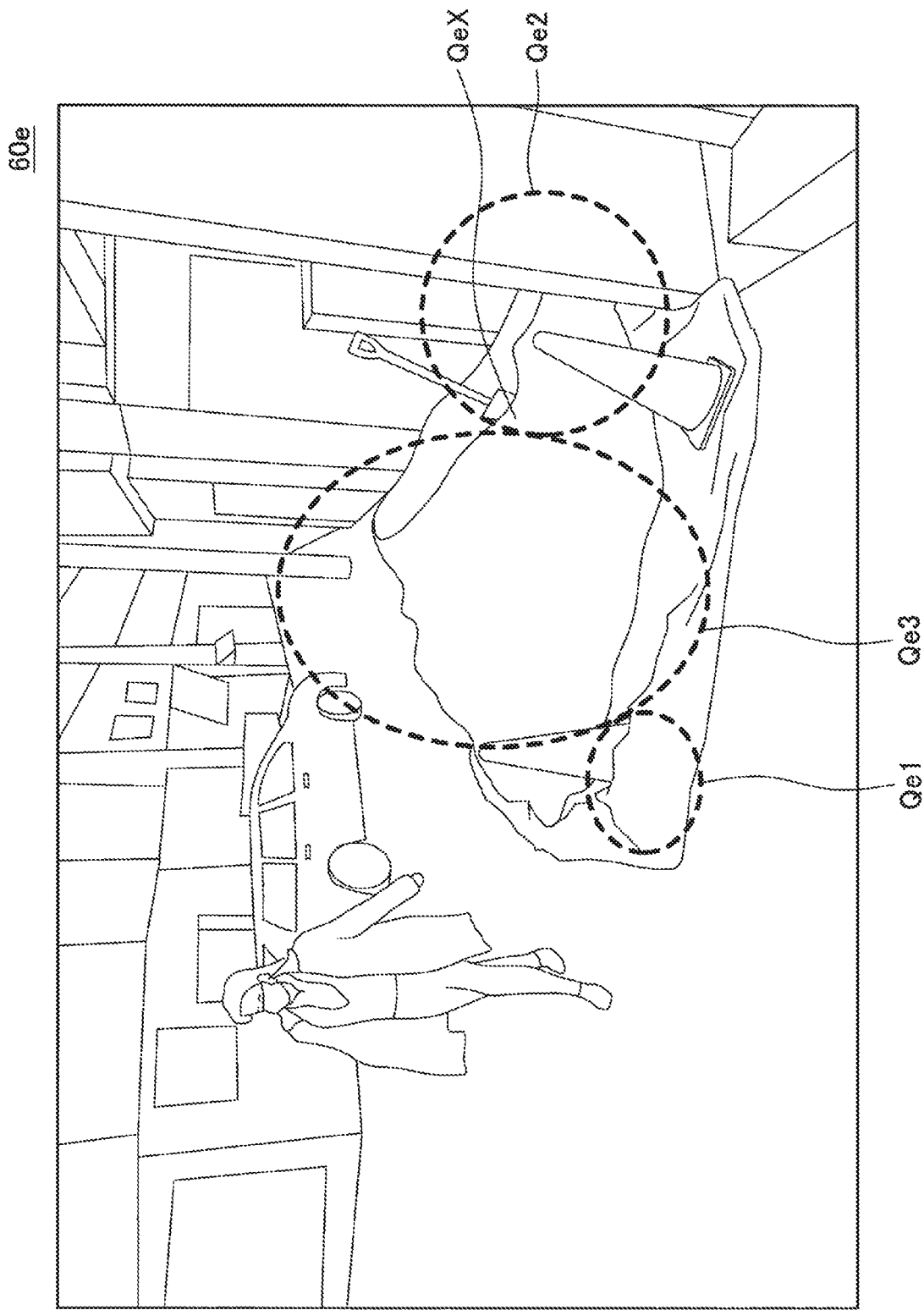

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/040071 filed on Oct. 29, 2018, which claims priority benefit of Japanese Patent Application No. JP 2017-231960 filed in the Japan Patent Office on Dec. 1, 2017. Each of the above-referenced applications is hereby incorporated herein by reference in its entirety.

FIELD

The present disclosure relates to an information processing device, an information processing method, and a program.

BACKGROUND

In recent years, an Augmented Reality (AR) superimposition technology called AR that superimposes additional information on a reality space (hereinafter, referred to as a real space) and presents it to a user has been developed. The additional information to be superimposed may be visualized by displaying various types of display items such as text, icons, or animations in front of the user's eyes.

Patent Literature 1 discloses a technology for controlling display of the display items in order to reduce a risk of the user overlooking necessary display items when the display items are diversified and a plurality of display items are displayed.

CITATION LIST

Patent Literature

Patent Literature 1: JP 2014-71811 A

SUMMARY

Technical Problem

However, Patent Literature 1 does not disclose a method for controlling the display items when the plurality of display items are displayed or erased. For this reason, the plurality of display items are displayed or eased all at once, which may affect an entire view of the user. When the display items affect the entire view of the user, the user may feel annoyed, which may be a factor that causes the user to feel uncomfortable in experiencing the AR superimposition technology.

In view of the above circumstances, it is desirable that the influence of the display items on the view of the user is reduced, and that the user can comfortably experience the AR superimposition technology.

Solution to Problem

According to the present disclosure, an information processing device is provided that includes: a display control unit that controls the presence or absence of a display item on a display unit based on a display order of display items determined according to environment information or user information, by using a change in behavior of a user as a trigger.

Moreover, according to the present disclosure, an information processing method is provided that includes: controlling, by a processor, the presence or absence of a display item on a display unit based on a display order of display items determined according to environment information or user information, by using a change in behavior of a user as a trigger.

Moreover, according to the present disclosure, a program is provided that causes a computer to function as: a display control unit that controls the presence or absence of a display item on a display unit based on a display order of display items determined according to environment information or user information, by using a change in behavior of a user as a trigger.

According to the present disclosure, an influence on a view of a user can be reduced by controlling the presence or absence of display items on a display unit based on a display order of the display items determined according to environment information or user information by using a change in behavior of the user as a trigger.

Advantageous Effects of Invention

As described above, according to the present disclosure, the influence of the display item on the view of the user can be reduced, and the user can comfortably experience the AR superimposition technology.

Note that the above effects are not necessarily limited, and any of the effects illustrated in the present specification or other effects that can be grasped from the present specification may be achieved together with or in place of the above effects.

BRIEF DESCRIPTION OF DRAWINGS

FIG. 7 is a diagram illustrating an example of display control according to the embodiment.

FIG. 8 is a diagram illustrating an example of display control according to the embodiment.

FIG. 9E is a diagram illustrating an example of a display order according to the embodiment.

DESCRIPTION OF EMBODIMENTS

Figure 1:
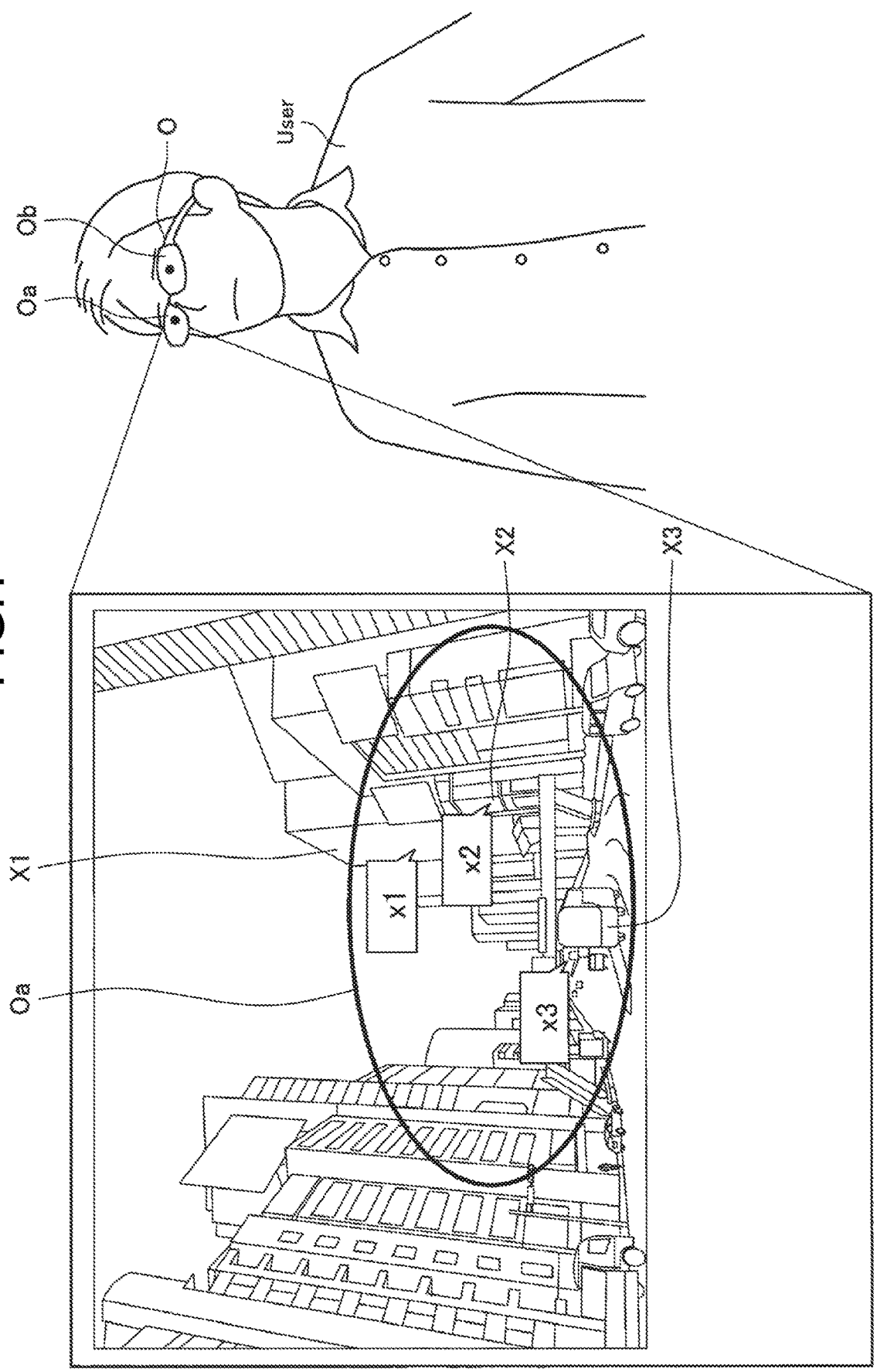
FIG. 1 is an explanatory diagram illustrating an overview of an information processing system according to an embodiment of the present disclosure.

Hereinafter, preferred embodiments of the present disclosure will be described in detail with reference to the accompanying drawings. In the present specification and the drawings, components having substantially the same functional configuration are denoted by the same reference numerals, and redundant description is omitted.

Note that, the description will be made in the following order.

1. Overview of information processing system according to one embodiment of the present disclosure
  1.1 External configuration
  1.2 Technical Overview
2. Configuration of information processing system
3. Flow of operation processing
4. Display control example
  4.1. Display control based on trigger
  4.2. Canceling display control by cancel operation
  4.3. Display control according to user status
5. Display order example
6. Modified example
7. Hardware configuration example
8. Summary

1. Overview of Information Processing System According to One Embodiment of the Present Disclosure

1.1. External Configuration

First, an overview of an information processing system according to an embodiment of the present disclosure will be described with reference to FIG. 1. FIG. 1 is a diagram illustrating a display device O to which an information processing system according to an embodiment of the present disclosure is applied, and a view of a user User on the display device O. The display device O illustrated in FIG. 1 is a device also called an AR glass or a head mounted display (HMD). The display device O has a pair of display units Oa and Ob for a right eye and a left eye arranged in front of the eyes of the user in a worn state as illustrated in FIG. 1. For the display units Oa and Ob, for example, a transmissive display is used, and the display device O can be controlled to a through state (i.e., transparent) or a translucent state by controlling transmittance of the transmissive display. Since the display device O can be used like glasses with the display units Oa and Ob being in a through state, the user can act without hindrance to normal life even if the user always wears the display device O.

The display units Oa and Ob can superimpose and display items on a scenery of a real space by displaying images such as texts and figures in a transparent or translucent state. That is, the display device O may be realized as a transmissive AR glass.

FIG. 1 illustrates an aspect in which display items x1, x2, and x3 corresponding to a building X1, a building X2, and a bus X3 in the real space are displayed on the display unit Oa. The technology of the present disclosure can be applied to a case where display items are superimposed and displayed on such a scenery of a real space.

In addition, the display units Oa and Ob can superimpose and display a display item on the captured image of the real space while displaying a captured image of the real space. In addition, the display units Oa and Ob can superimpose and display a display item on an image of a virtual space while displaying an image as if the real space is imaged. That is, the display device O may be a video see-through type display device.

Various contents can be displayed as the display items on the display units Oa and Ob. The content is assumed to be any data to be displayed, such as a time, a map, a game image based on a game program, an icon that can be input by the user, and the like.

As above, an example of the display device O to which the technology of the present disclosure can be applied has been described. Hereinafter, a case will be described in which the display device O including the information processing system of the present disclosure is an AR glass.

1.2. Technical Overview

Figure 2:
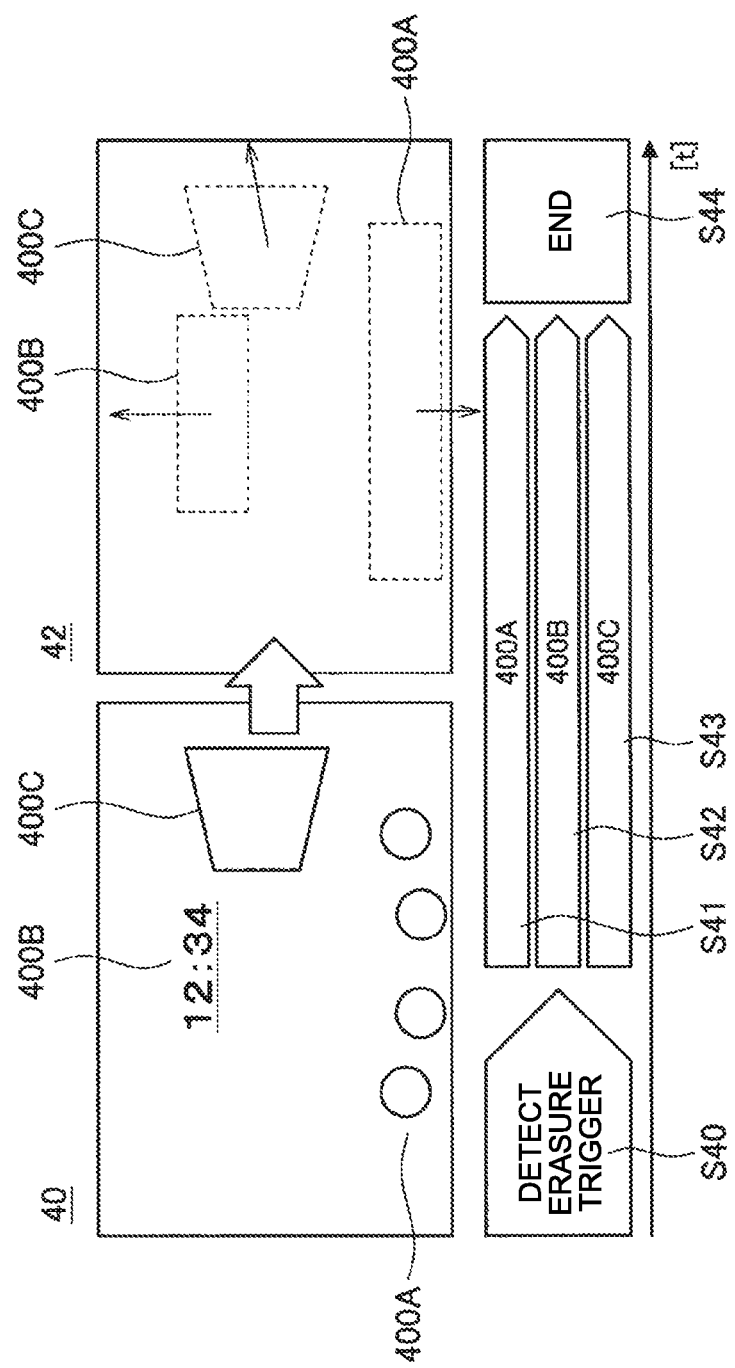
FIG. 2 is an explanatory diagram illustrating an overview of an information processing system according to the embodiment.

Here, the technical overview of the present disclosure will be described with reference to FIG. 2. FIG. 2 illustrates user views 40 and 42 on which the display device O is worn. At this time, the user is stopped in the user view 40, and display items 400A, 400B, and 400C are displayed in the user view 40. Since the user is stopped, there is no problem even if a part of the user view 40 is obstructed by the display items 400A, 400B, and 400C.

On the other hand, when the user starts walking, the user's view is obstructed by the display items, which may become an obstacle and make the user feel annoyed when recognizing the real space. Therefore, for example, when the user starts walking, as illustrated in the user view 42, the display items 400A, 400B, and 400C are erased from the user view 42, so that the user can easily recognize the real space.

In FIG. 2, by detecting an erasure trigger (S40) when the display items are erased, the display items 400A, 400B, and 400C are simultaneously erased at the same timing (S41, 42, 43), and the display control ends (S44).

However, if the display items 400A, 400B, and 400C are erased all at once when the user changes from a stopped state to the walking state, an influence or change on the user' view is large. For this reason, it is difficult for the user to adapt to the change in the view, and the user may feel uncomfortable when experiencing the AR superimposition technology.

Figure 3:
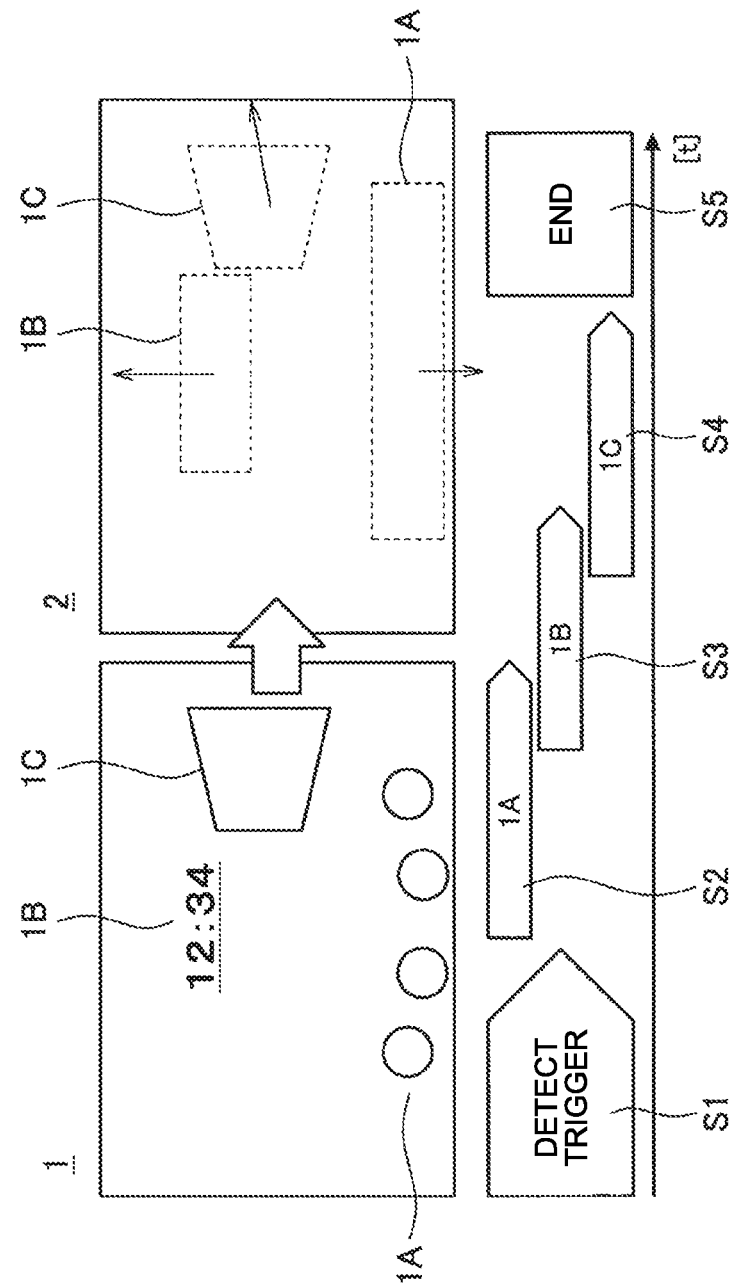
FIG. 3 is an explanatory diagram illustrating an overview of an information processing system according to the embodiment.

Therefore, a technical overview of the present disclosure will be described with reference to FIG. 3. FIG. 3 illustrates a user view 1 on which the display device O is worn, similarly to FIG. 2. At this time, the user is stopped in the user view 1, and display items 1A, 1B, and 10 are displayed in the user view 1. A user view 2 illustrates a state in which the display items 1A, 1B, and 10 are erased from the user view 2.

According to the technology of the present disclosure, for example, a trigger is detected (S1) by a change in behavior that changes from a state in which the user stops to a state in which the user walks, and a display control in which the display items 1A, 1B, and 1C are respectively erased in the order of the display item 1A (S2), the display item 1B (S3), and the display item 1C (S4) is performed. Finally, the display control is ended by erasing the display item 1C (S5). As described above, according to the technology of the present disclosure, the presence or absence of the display items on a display unit can be controlled based on a display order of the display items determined according to environment information or user information, by using the change in behavior of the user as a trigger.

The environment information is luminance information, color information, sound information, depth information, or the like of the environment around the user, and includes information on the shape, position, and movement of an object such as a building or an obstacle existing in the real space. In addition, the user information includes the user's line-of-sight and view information, posture information, movement information, and the like. The display order can be determined based on the environment information and user information.

In the above, the technical overview of the present disclosure has been described. A detailed description will be given in the following sections.

2. Configuration of Information Processing System

Figure 4:
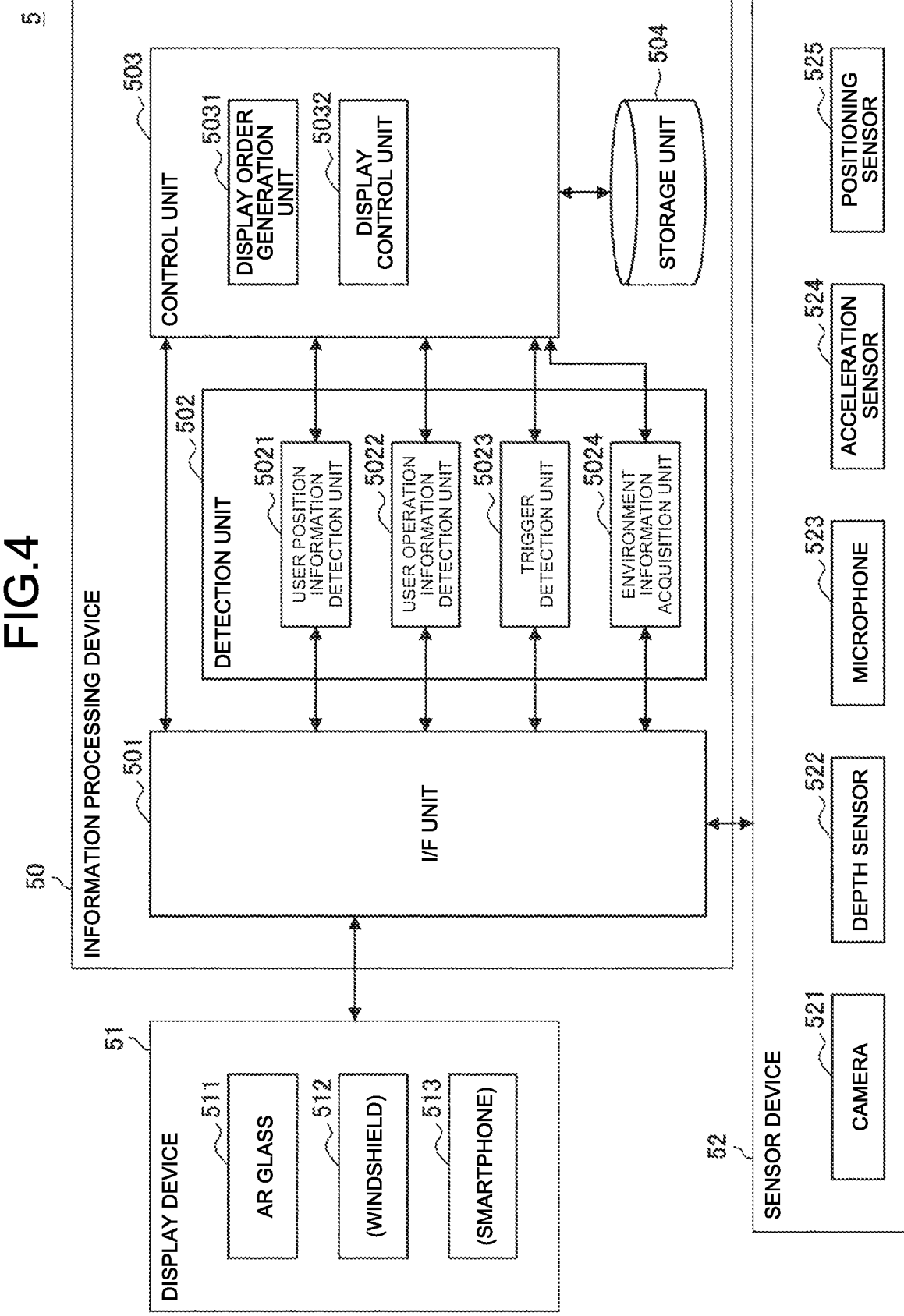
FIG. 4 is a block diagram illustrating an information processing system according to the embodiment.

Here, the information processing system 5 will be described with reference to FIG. 4. FIG. 4 is a block diagram illustrating an example of a configuration of an information processing system 5 according to the embodiment. The information processing system 5 includes an information processing device 50, a display device 51, and a sensor device 52.

In the information processing system 5, the information processing device 50 acquires information necessary for performing control processing of the presence or absence of the display item from the sensor device 52, and perform a display control so that the user can visually recognize the presence or absence of the display item on the display device 51. Hereinafter, the details of each configuration will be described.

[Sensor Device 52]

The sensor device 52 has a function of acquiring user information and environment information used by the information processing device 50. As long as the sensor can obtain the user information and the environment information, the type of sensor is not limited, and the number of various sensors mounted is not limited. In the present embodiment, a sensor device 52 including a camera 521, a depth sensor 522, a microphone 523, an acceleration sensor 524, and a positioning sensor 525 will be described.

(Camera 521)

The camera 521 is an imaging device that captures an image (still image or moving image) such as an RGB camera or a thermo camera, and may include a lens system, a driving system, and an imaging element. The captured image obtained by the camera 521 may be used for image analysis or may be used for display on the display device 51.

In addition, the camera 521 may be used to acquire the environment information by imaging a real space, and may be used to acquire the user information by analyzing line-of-sight information such as movement of a user's eyeball and line-of-sight by being directed to the user. As described above, since the camera 521 can acquire the environment information and the user information, it is possible to grasp the user's focus on the display item or the real space.

(Depth Sensor 522)

The depth sensor 522 has a function of acquiring depth information of an object in the real space. For example, the depth sensor 522 may include an infrared distance measuring device, an ultrasonic distance measuring device, a laser imaging detection and ranging (LiDAR), a stereo camera, or the like. The depth information acquired by the depth sensor 522 is used to determine a display position of the display item for the user and the like, and is used so that the user can visually recognize the display item at an appropriate position.

(Microphone 523)

The microphone 523 is a device that collects surrounding sounds and outputs audio data converted into digital signals via an amplifier and an analog digital converter (ADC). When the presence or absence of the display item is controlled according to the sound collected by the microphone 523, an output display mode can be changed. As an example of changing the display mode according to the collected sound, when a sound in which a car sound approaches from a right side of the user is collected, the display item may be erased so as to move the display item from the right side to the left side of the user. As described above, by controlling a direction in which the display item is erased according to a direction of the sound collected by the microphone 523, the user can more intuitively predict the danger of the direction in which the car is approaching.

(Acceleration Sensor 524)

The acceleration sensor 524 can measure gravitational acceleration and acquire sensor data (acceleration data) indicating the magnitude and direction of the gravitational acceleration. When the sensor device 52 is worn by a user, the sensor device 52 can acquire information such as a user's movement or gesture. For example, when the acceleration sensor 524 is worn on a user's head, the acceleration sensor 524 can obtain information such as the user's head shaking or nodding. In addition, instead of the acceleration sensor 524, a sensor for detecting an angular velocity, such as a gyro sensor, may be used.

(Positioning Sensor 525)

The positioning sensor 525 has a function of acquiring information on a position of the user. The positioning sensor 525 may be, for example, a global navigation satellite system (GNSS) sensor that receives a GNSS signal and measures the latitude, longitude, and altitude of the device. Alternatively, the positioning sensor may be a sensor that performs positioning based on the strength of a radio signal received from a radio access point. By providing the GNSS and a step counter, it is possible to acquire information on not only the position of the user but also a moving speed of the user.

In addition, the sensor device 52 may acquire the position information of the user and the information on the moving speed by a simultaneous localization and mapping (SLAM) technology using these various sensors.

[Information Processing Device 50]

The information processing device 50 detects and acquires user information and environment information necessary for display control of a display item from the sensor device 52, and controls the presence or absence of the display item on the display device 51. The information processing device 50 includes an I/F unit 501, a detection unit 502, a control unit 503, and a storage unit 504.

(I/F Unit 501)

The I/F unit 501 is a connection device for connecting the information processing device 50 to another device. The I/F unit 501 is realized by, for example, a universal serial bus (USB) connector or the like, and inputs and outputs information between the respective components of the display device 51 and the sensor device 52.

(Detection Unit 502)

The detection unit 502 includes a user position information detection unit 5021, a user operation information detection unit 5022, a trigger detection unit 5023, and an environment information acquisition unit 5024. The detection unit 502 has a function of extracting target user information and environment information by each component from the sensor information acquired by the sensor device 52, and outputting detection data, which is the basis of control in the control unit 503, to the control unit 503.

User Position Information Detection Unit 5021

The user position information detection unit 5021 has a function of detecting information on a position of the user from the user information. The information on the position of the user includes movement information such as the position of the user in the real space, a moving direction or a moving speed of the user.

User Operation Information Detection Unit 5022

The user operation information detection unit 5022 has a function of detecting information relating to an operation of the user from the user information. The operation of the user includes a posture of the user, a gesture of the user, and the like. The operation of the user includes a state in which the user stops, a state in which the user is walking, a state in which the user is standing, a state in which the user is sitting, and the like, and the gesture of the user includes a user's shaking or nodding, an air pointing gesture, and the like.

In addition, the information relating to the operation of the user may include information indicating a line-of-sight of the user. The information indicating the line-of-sight of the user includes information indicating the position and the direction of the line-of-sight of the user. In addition, the information indicating the line-of-sight of the user may include information indicating a direction of a face or head of the user, and may further include information indicating a direction of an eyeball.

Trigger Detection Unit 5023

The trigger detection unit 5023 determines whether there is a trigger indicating a predetermined change in behavior for performing display control, from information relating to the change in behavior of the user including the position information and the operation information of the user. Then, the trigger detection unit 5023 has a function of detecting the change in behavior of the user as a trigger signal if the change in behavior of the user is a predetermined trigger.

The predetermined change in behavior may include information on a user operation such as a state in which the user is stopped or moving, a state in which the user is walking or running, a state of quick walking or short running, and the like. In addition, when the user is in a car, the predetermined change in behavior may include whether the car is stopped or running, or whether the car is moving forward or backward.

Further, the trigger detection unit 5023 may use information such as whether the user is standing or sitting as a trigger, or the gesture of the user as a trigger. The gesture of the user may also include behaviors such as the user's shaking or nodding, an air pointing gesture, and talking to others.

Environment Information Acquisition Unit 5024

The environment information acquisition unit 5024 has a function of detecting environment information based on information sensed by the sensor device 52. The environment information acquired by the environment information acquisition unit 5024 can be used to generate a display order of the display items by a display order generation unit 5031 provided in the control unit 503.

The environment information includes information indicating the shape, position, and movement of an object such as a building or an obstacle existing in the real space. If the object existing in the real space is the building, it is highly likely that the user has recognized the building in advance. For this reason, even if the display item is superimposed on the building, the user is less likely to feel uncomfortable. However, when the object existing in the real space is the obstacle or the moving object, it is unlikely that the user has recognized the object in advance. In this case, if the display item is superimposed on the object such as the obstacle for the user, the user may feel uncomfortable. The control unit 503 can control the presence or absence of the display item by acquiring various pieces of information on the object in the real space in this manner.

In addition, the environment information may include information on environment sound in the real space. By grasping the environment sound, when the control unit 503 controls the presence or absence of the display of the display item, for example, when the environment sound of an approaching car is collected, it is possible to control the display item to be erased in a direction opposite to the approaching car. By enabling such control, the user can experience the AR superimposition technology more comfortably.

[Control Unit 503]

The control unit 503 includes a display order generation unit 5031 and a display control unit 5032. The control unit 503 has a function of generating a display order based on the user information and the environment information detected by the detection unit 502, reducing the influence on the view of the user, and controlling the presence or absence of the display item.

Display Order Generation Unit 5031

The display order generation unit 5031 has a function of generating a display order of the order in which the display items disappear and the order in which the display items are displayed, when the presence or absence of the display item is controlled. The display order indicates an order in which the presence or absence of the display item is controlled in time series by the display control unit 5032. By controlling the display of the display items in time series, the influence on the view of the user can be given gradually. This can reduce the annoyance felt by the user due to a change in the view when the display items are simultaneously displayed or erased. In present specification, the higher the display order, the earlier the display, and the lower the display order, the later the display. That is, when displaying the display items, the higher the display order of the display items, the earlier the display is performed. On the other hand, when erasing the display items, the lower the display order of the display items, the earlier the display is erased.

The display order generation unit 5031 determines the display order according to the environment information or the user information. For example, when using the environment information, the display order generation unit 5031 determines the display order according to a distance between the user and the building in the real space. When using the user information, the display order generation unit 5031 determines the display order according to the line-of-sight information of the user. Details of variations of such a display order will be described later.

The display order of the display items may be determined according to the degree of influence on the view of the user based on the information acquired from the environment information and the user information. The degree of influence on the view of the user is an index indicating a display state of a display item that the user easily feels uncomfortable. The degree of influence on the view of the user can be calculated based on a display position of the display item, an area (display area) where the display item is displayed, and a view range of the user.

Display Control Unit 5032

The display control unit 5032 has a function of controlling whether or not the display items are displayed on the display device 51 in accordance with the display order generated by the display order generation unit 5031. The display control unit 5032 also has a function of controlling a display mode when displaying or erasing the display items.

The display control unit 5032 may display the display items or erase the display items at different timings according to the display order. When the display control unit 5032 displays the display items, the display control unit 5032 starts displaying a display item having a higher display order first according to the display order, and starts displaying a next display item at a timing different from the display start timing of the firstly displayed display item. The display start timing of the firstly displayed display item and the display start timing of the next displayed display item need only be different, not simultaneously.

When the display control unit 5032 erases the display items, the display control unit 5032 starts easing a display item having a low display order first according to the display order. The erasure of the next display item is started at a timing different from the erasing start timing of the firstly erased display item. The erasing start timing of the firstly erased display item and the erasing start timing of the next erased display item need only be different, not simultaneously.

As described above, the display items are suppressed from being displayed or erased all at once and the display items are gradually displayed or erased due to the different start timings of the displaying and the erasing of the display items, the influence on the view of the user can be suppressed.

The display mode when the display items are displayed or erased indicates a visual expression when the display items are displayed or erased. For example, when the display items are erased, the display control unit 5032 may control a display mode when the display items are erased using an expression in which the display items move out of the display unit according to the display order.

On the other hand, when the display items are displayed, the display control unit 5032 may perform the display control using an expression in which the display items move into the display unit according to the display order. In this manner, by moving the display items and controlling the presence or absence of the display item, the influence on the view of the user is small, and the user can comfortably experience the AR superimposition technology.

Further, the direction in which the display items are moved may be determined according to the environment information. For example, when the car is approaching the user, the display items move in a direction opposite to the approaching direction of the car, so that the display can be controlled while notifying the user that the car is approaching.

In addition, when the display items are erased, the display control unit 5032 may control the display mode in which the display items are erased using an expression in which the display items fade out according to the display order of the display items.

On the other hand, when the display items are displayed, the display control unit 5032 may control the display using an expression in which the display items fade in according to the display order. In this way, by gradually changing the display items and controlling the presence or absence of the display item, the influence on the view of the user is small, and the user can comfortably experience the AR superimposition technology.

The fade in and fade out may be expressed by, for example, an expression in which a transmittance of the display item gradually changes, or an expression in which a resolution of the display item gradually changes. In this way, by gradually changing the display items and controlling the presence or absence of the display item, the influence on the view of the user is small, and the user can comfortably experience the AR superimposition technology. Although the display mode controlled by the display control unit 5032 has been described above, the display mode is not limited to the example, and may include other various display modes.

The storage unit 504 stores programs and parameters for the control unit 503 or the detection unit 502 to execute each function. For example, the storage unit 504 stores a recognition algorithm used for recognition processing of the user information and the environment information by the detection unit 502, various thresholds used for generation processing of the display order, and the like.

[Display Device 51]

The display device 51 has a function of displaying and outputting the display items on and to the display unit based on the display order generated by the information processing device 50. The display device 51 may include, for example, an AR glass 511, a car windshield 512, or a smartphone 513. The AR glass 511 is a glasses-type wearing device having a screen and capable of displaying an image. The car windshield 512 is a windshield having a display unit or a screen and capable of displaying an image. The smartphone 513 is a radio communicable portable mobile device having a screen and outputting images, sounds, vibrations, and the like. The display device 51 is not limited to such an example as long as an image or the like can be displayed as described above.

Hereinabove, each configuration of the information processing system 5 has been described. Each configuration may be used alone, or each configuration may be used in combination.

3. Flow of Operation Processing

Figure 5:
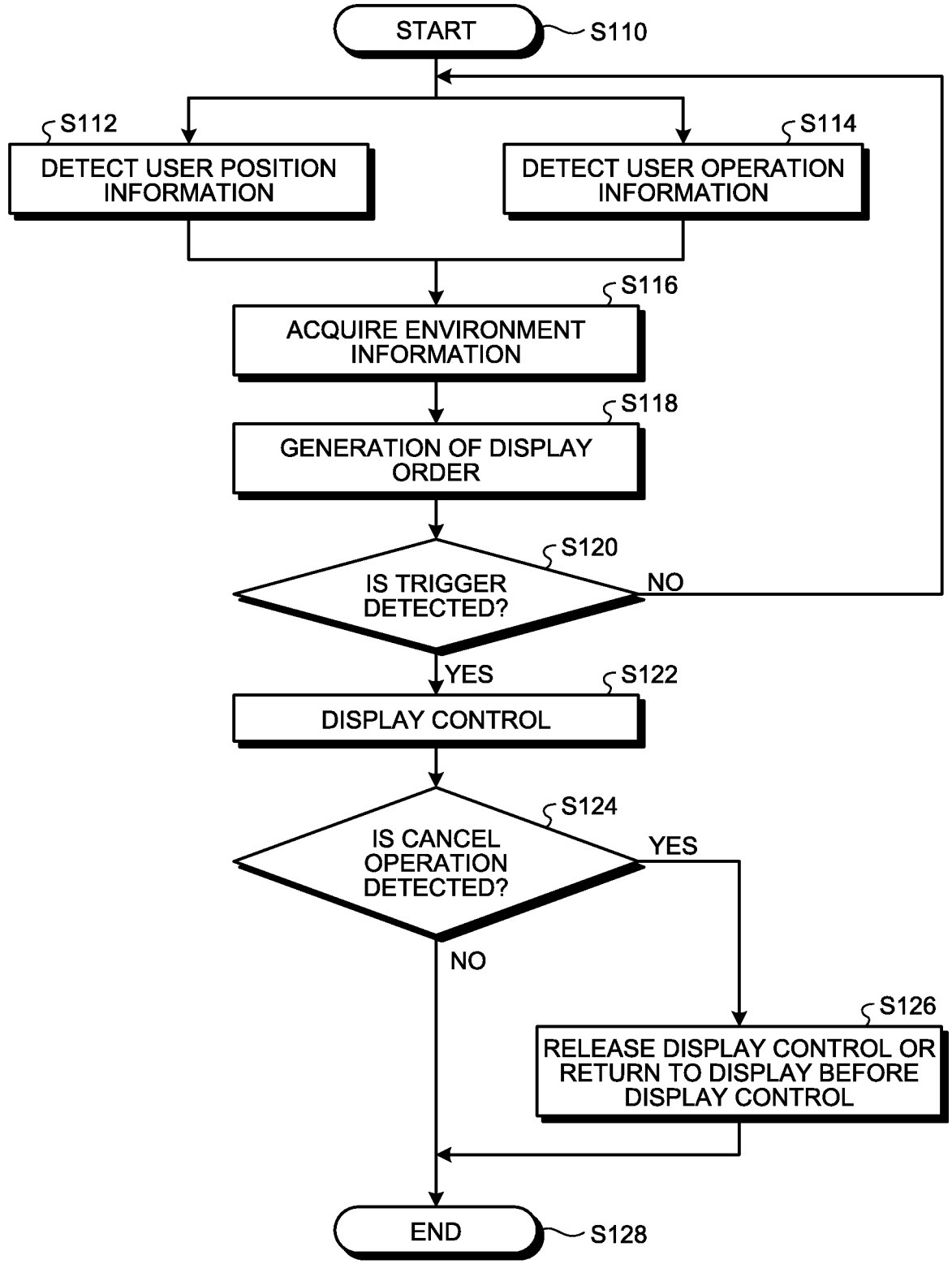
FIG. 5 is a flowchart illustrating a flow of an operation of the information processing system according to the embodiment.

Here, a flow of an operation in which each component described above operates will be described with reference to FIG. 5. First, a power button or the like of the information processing device 50 is pressed (S110).

Next, based on the sensor information acquired from the sensor device 52, the user position information detection unit 5021 and the user operation information detection unit 5022 detect the user position information and the user operation information (S112 and S114).

Next, based on the sensor information acquired from the sensor device 52, the environment information acquisition unit 5024 acquires the environment information (S116).

Next, the display order generation unit 5031 generates the display order of the display items based on the user information and the environment information (S118).

Next, the trigger detection unit 5023 determines whether or not a trigger has been detected based on the user information (S120). Here, when the trigger is not detected, the detection of the user position information and the detection of the user operation information are started again, and the generation of the display order is repeated. When the trigger is detected by the trigger detection unit 5023, the operation proceeds to the next processing.

Next, the display control unit 5032 performs displaying or erasing of the display items and display control of the display mode, based on the generated display order (S122).

Next, it is determined whether or not a cancel operation has been performed during the display control (S124). For example, during the display control of the display items, the user may want to interrupt the display control. At this time, the display control can be released by detecting the cancel operation. The cancel operation referred to here is a gesture set in advance as a cancel operation, and may be, for example, a gesture such as the user's shaking or nodding. By detecting these gestures, the user can instruct to release the display control. Here, the gesture is exemplified, but the cancel operation may be input of a voice or the like, or the user may detect the cancel operation by emitting a voice such as "release" and analyzing the voice.

Next, when the cancel operation is detected, the display control unit 5032 performs processing of releasing the display control or returning the display items to a display state before the display control. For example, the display control unit 5032 may perform control for keeping the display items in the state at the time when the cancel operation is detected, or may perform control for returning to the state before the presence or absence of the display item is controlled (S126).

When the cancel operation is not detected, the display control is performed (S122), and the information processing system 5 ends the operation processing (S128).

Hereinabove, the flow in which the information processing system 5 performs the operation processing has been described. The operation order is not limited to the example. For example, it is described that the environment information is acquired after the detection of the user position information and the detection of the user operation information, but these are performed in any order and may be performed simultaneously.

4. Display Control Example

Here, an example of performing display control regarding the presence or absence of the display item will be described with reference to FIGS. 6 to 8.

4.1. Display Control Based on Trigger

Figure 6:
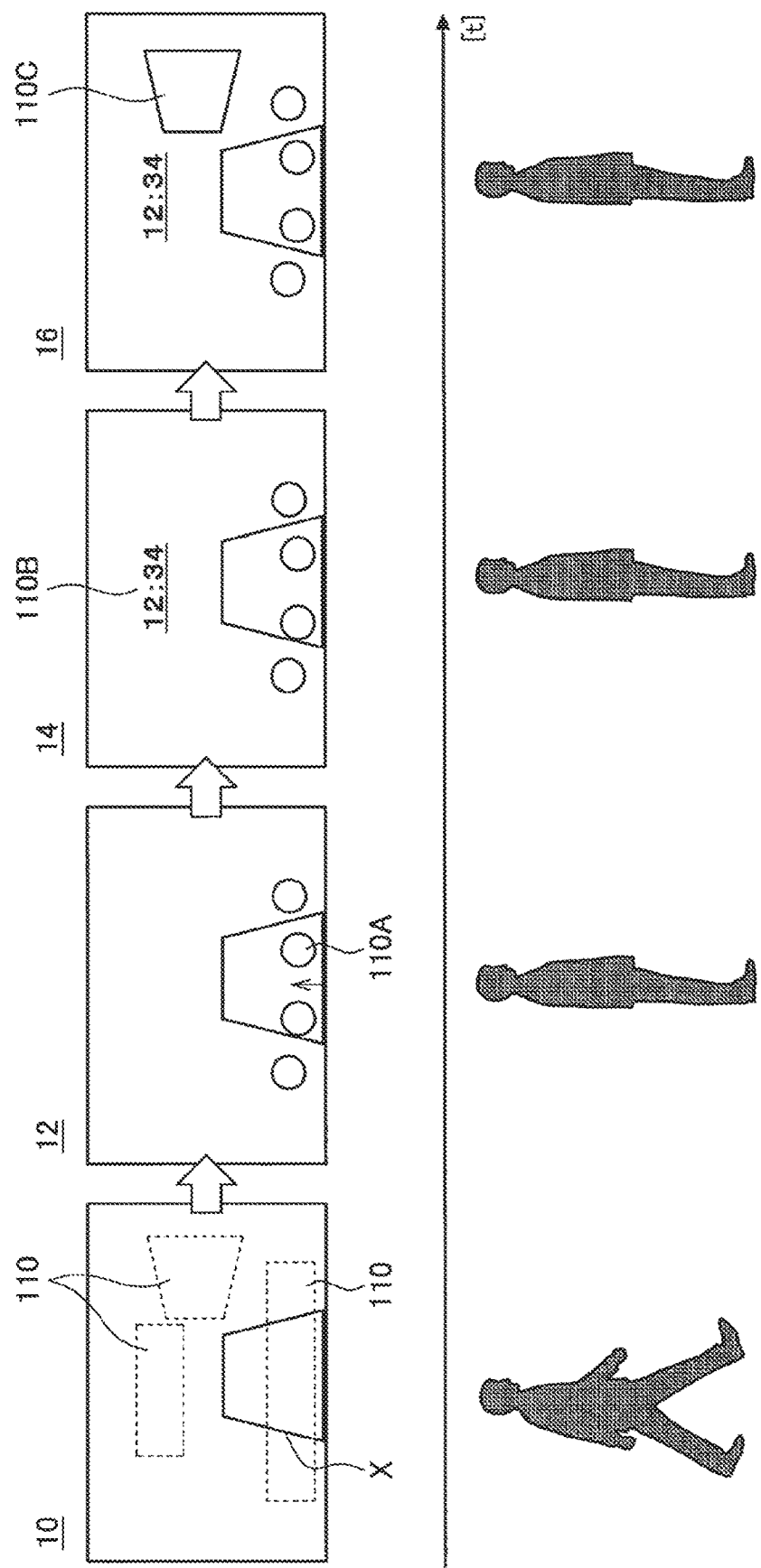
FIG. 6 is a diagram illustrating an example of display control according to the embodiment.

In FIG. 6, a control of the presence or absence of the display item based on the trigger will be described. FIG. 6 illustrates display control for displaying display items when the user stops from a state of walking. A user view 10 represents a view of a user in a state of walking. In the user view 10, there is a road X on which the user walks. A display space 110 in the user view 10 represents an area where display items can be displayed. When the display control is executed, the display items are displayed in the display space 110. In the user view 10, the display control has not been executed yet, and the display items are not visually recognized in the display space 110.

A user view 12 represents a view of a user in a state in which the user is stopped. The trigger detection unit 5023 detects that the user is stopped as a trigger, and the display control unit 5032 starts controlling the presence or absence of the display item. In the user view 12, first, a display item 110A is displayed according to the display order determined in advance by the display order generation unit 5031. A user view 14 illustrates that the user is continuously in the stopped state, and a display item 110B is displayed next to the display item 110A. A user view 16 illustrates that the user is continuously in the stopped state, and a display item 110C is displayed following the display items 110A and 110B.

In this manner, the display control unit 5032 may control the presence or absence of the display item on the display unit based on the display order of the display items determined according to the environment information or the user information, by using the change in behavior of the user as the trigger. This makes it possible to control the display of display items while reducing the influence on the view of the user, and the user can comfortably experience the AR superimposition technology.

In FIG. 6, the display control unit 5032 performs the display control by using the change in behavior from the state in which the user is walking to the state in which the user is stopped, but is not limited to such an example. In addition, as a type of the trigger, a change in behavior from a state in which the user is walking to a state in which the user is running may be used as the trigger, and a change in posture from a state in which the user is standing to a state in which the user is sitting may be used as the trigger. As described above, by detecting any change in behavior of the user as the trigger, the display control unit 5032 can realize the display control of display items according to the situation of the user.

FIG. 6 illustrates an example in which the display items are sequentially displayed, but when the change in behavior of the user from the state in which the user is stopped to the state in which the user is walking is used as the trigger, the display items may be sequentially erased. If the display items remain displayed when the user starts walking, the view of the user may be obstructed, and therefore, the annoyance for the user can be reduced by erasing the display items. In this case, as illustrated in FIG. 6, the display items are displayed in order, and the display items are erased in order (for example, in a reverse order to the order in which the display items in FIG. 6 are displayed), such that Influence on the view of the user can be made smaller, and the user can easily apply the change in the view due to the presence or absence of the display item.

4.2. Release of Display Control by Cancel Operation

FIG. 7 illustrates a case where a cancel operation is detected during display control based on a trigger. FIG. 7 illustrates a state in which the user is continuously walking, and a user view 20 represents the view of the user when the user is walking. In the user view 20, there is a road X on which the user walks. A display space 210 in the user view 20 represents an area where display items can be displayed. When the display control is executed, the display items can be displayed in the display space 210. In the user view 20, the display control has not been started yet, and the display items are not visually recognized in the display space 210.

Although the user is continuously walking, a user view 22 illustrates that the trigger detection unit 5023 erroneously detects that the user has changed from a walking state to a stopped state. The user view 22 illustrates that a display item 210A is displayed according to the display order generated by the display order generation unit 5031. Subsequently, in a user view 24, a display item 210B is displayed after the display item 210A according to the display order. However, since the user has not actually stopped and the trigger detection is erroneous, the user performs a gesture G1 of a cancel operation to release the display control. Here, a shaking gesture is given as the gesture G1 of the cancel operation, but the gesture G1 is not limited to such an example. The cancel operation may be sound.

When detecting the gesture G1 of the cancel operation, the display control unit 5032 may release the display control. A user view 26 illustrates a display space 210C in which no display items are displayed. As described above, after the gesture G1 of the cancel operation is performed, the display control of the display items displayed thereafter may be interrupted. In addition, not only the display of the display item may be interrupted, but also the state before starting the display control may be returned. A user view 28 represents a view of the user that the display control unit 5032 is returned to the state before starting the display control. By releasing the display control by the display control unit 5032 as described above, the view the user can be prevented from being obstructed.

4.3. Display Control According to Movement State of User

The display control unit 5032 may control the presence or absence of the display item according to a movement state of the user. The display control according to the movement state of the user will be described with reference to FIG. 8. FIG. 8 illustrates a state where the user starts walking and then starts running from a stopped state. First, a user view 30 illustrates a view ahead of the line-of-sight toward the front of the user in a stopped state. A user view 30b illustrates a view at the user's feet in a state in which the user is stopped. If the user is in the stopped state, even if the display item obstructs the user's view, the display items may be entirely displayed because the influence on the user's view is small. The user views 30 and 30b illustrate a state where all display items are displayed, and display items 310A to 310D are displayed.

User views 32 and 32b illustrate user's views when the state of the user changes from the stopped state to a walking state. Since it is better not to display the display items at the user's feet when the user walks, the display item 310A has a low display order in the view 32b at the user's feet, and the display item 310A is first erased.

In user views 34 and 34b, the user is continuously walking. Therefore, the display item 310B is erased after the display item 310A according to the display order. A user view 36 illustrates a state in which the user has changed from a walking state to a running state. Since a moving speed is high when the user runs, the user can act more comfortably when the display items are not displayed more in the user view. The user view 36 illustrates a state in which the display items 310C and 310D have been erased from the view, by using that the user has started running as a trigger. As described above, the display control unit 5032 may control the presence or absence of the display item according to the movement state of the user.

Here, a display control method according to the movement state from the state in which the user is stopped to the time when the user starts running has been described. Specifically, the stopped state may be that the moving speed of the user is 1.5 km/h or less, the walking state may be that the moving speed of the user is 3 km/h or more, and the running state may be that the moving speed of the user is 6 km/h or more. As described above, by providing a first threshold, a second threshold, and a third threshold, the display control unit 5032 may perform fine display control for the movement state of the user by using the movement state of the user at the time of trigger detection. Here, a predetermined threshold is set as three types of thresholds, but the number of threshold settings is not limited. In addition, it is possible to arbitrarily set a value of the threshold.

An example has been described above in which the control of the presence or absence of the display of the display item is performed.

5. Display Order Example

Here, a variation of a control order of the presence or absence of the display when controlling the presence or absence of the display item will be described. The display order of the display items is determined according to the degree of influence on the view of the user. The degree of influence on the user can be calculated based on a display position of the display item, a display area of the display item, and a view range of the user.

For example, when there is a display item in which the display area of the display item has the same area, the closer the display position of the display item is to the user, the larger the ratio of the display area occupied in the view of the user. Therefore, the degree of influence on the view of the user increases. On the other hand, if the display area of the display item is small in the first place even when the display position of the display item is close to the user, the user is less likely to feel annoyance. For this reason, the degree of influence on the view of the user is reduced. In addition, even if the display item is located near the user, the user is less likely to feel annoyance when the user is looking far away. As described above, when the view range of the user is different from the position of the display item, the degree of influence on the view of the user is small.

As described above, the degree of influence on the view of the user can change depending on the display position of the display item, the display area thereof, and the view range of the user. Therefore, the degree of influence on the user is calculated from these viewpoints, and the display order of the display items is determined. Hereinafter, an example of the display order of the display items will be described with reference to FIGS. 9A, 9B, 9C, 9D, and 9E.

Figure 9A:
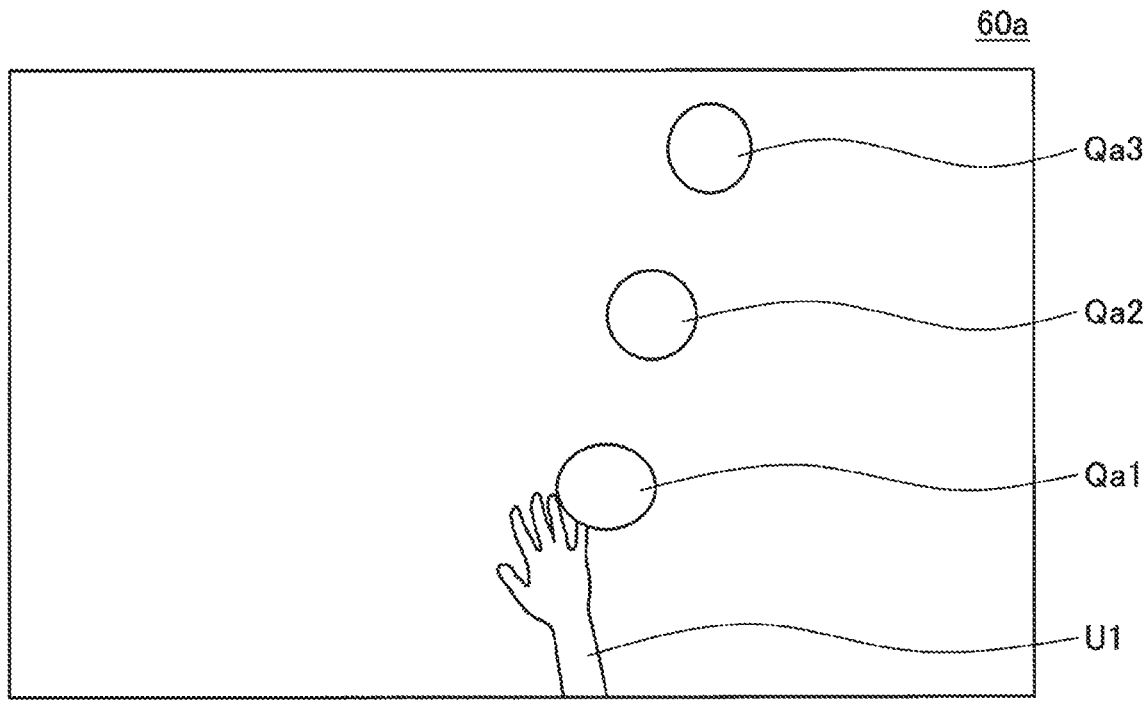
FIG. 9A is a diagram illustrating an example of a display order according to the embodiment.

FIG. 9A is a diagram illustrating an example of the display order of the display items. FIG. 9A illustrates a user view 60a at the hand of a user U1. With the hand of the user U1 as a starting point, display items are displayed in the order of Qa1, Qa2, and Qa3. At this time, the user U1 is in a stopped state. The closer the display item is to a body of the user, the user is less likely to be disturbed when starting to walk from the stopped state. For this reason, the display item closer to the body of the user U1 has a smaller influence on the view of the user. Therefore, when the user U1 starts walking, the display control unit 5032 may perform control for easing the display items in the order of display items Qa3, Qa2, and Qa1 in the order of display items far from the user among the display items Qa1 to Qa3. Thereby, the user can perform an AR superimposition experience without feeling annoyance.

Figure 9B:
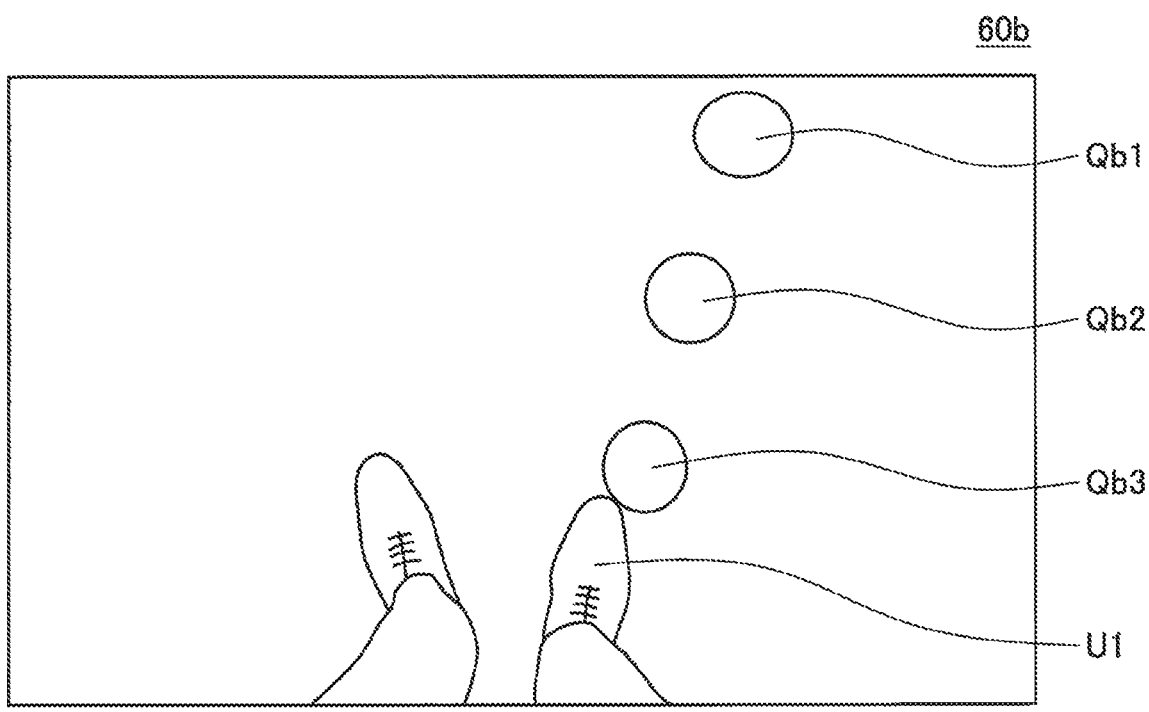
FIG. 9B is a diagram illustrating an example of a display order according to the embodiment.

FIG. 9B is a diagram illustrating an example of a display order of display items. FIG. 9B illustrates a user view 60b at the feet of the user U1. Display items are displayed in the order of Qb3, Qb2, and Qb1, starting from the feet of the user U1. At this time, the user U1 is in a stopped state. A display item closer to the feet of the user is more likely to cause annoyance when the user starts walking. Therefore, in this case, when the user starts walking, the display control unit 5032 may perform control for easing the display items in the order of the display items Qb3, Qb2, and Qb1 in order from the display item Qb3 closest to the user among the display items Qb3 to Qb1. Thereby, the user can perform an AR superimposition experience without feeling annoyance.

Figure 9C:
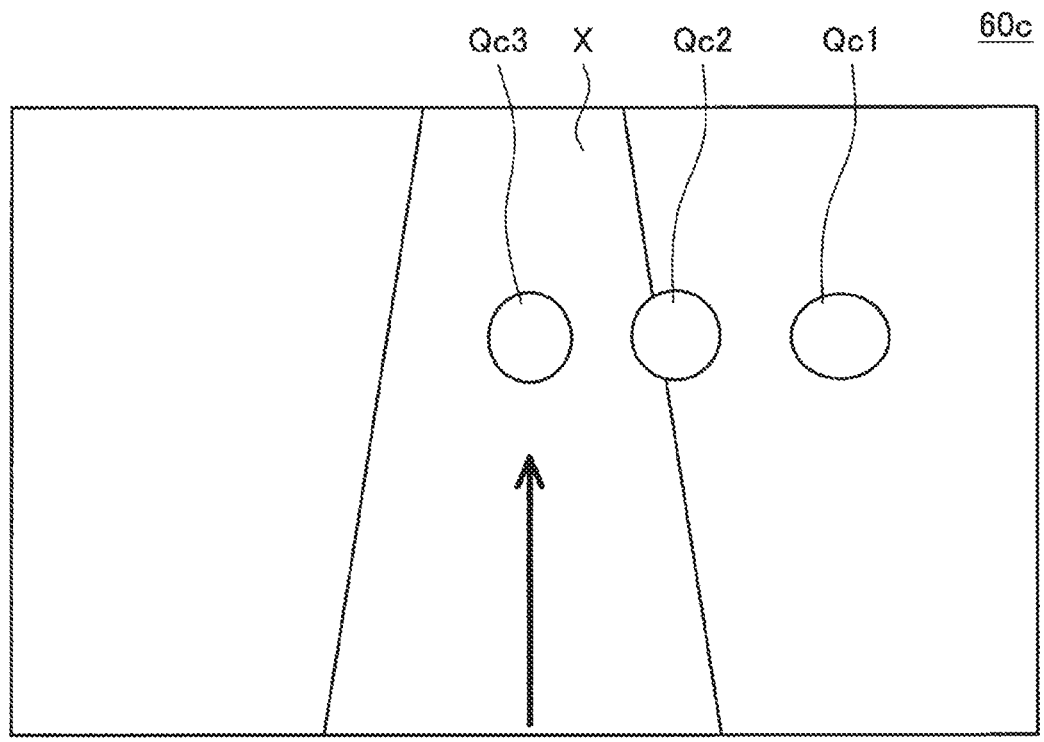
FIG. 9C is a diagram illustrating an example of a display order according to the embodiment.

FIG. 9C is a diagram illustrating an example of a display order of display items. FIG. 9C illustrates a user view 60c when the user U1 is walking forward. The road X to which the user U1 moves is illustrated in the user view 60c. The user U1 moves along the road X. Since a display item closer to a straight line in a moving direction of the user U1 can be an obstacle to the user U1, the user U1 feels annoyance. In this case, the display control unit 5032 may perform control for easing the display items in the order of display items Qc3, Qc2, and Qc1, starting from the display item Qc3 that is closer to the straight line in the moving direction of the user U1 with the user U1 as a starting point, Thereby, the user U1 can perform an AR superimposition experience without feeling annoyance.

Figure 9D:
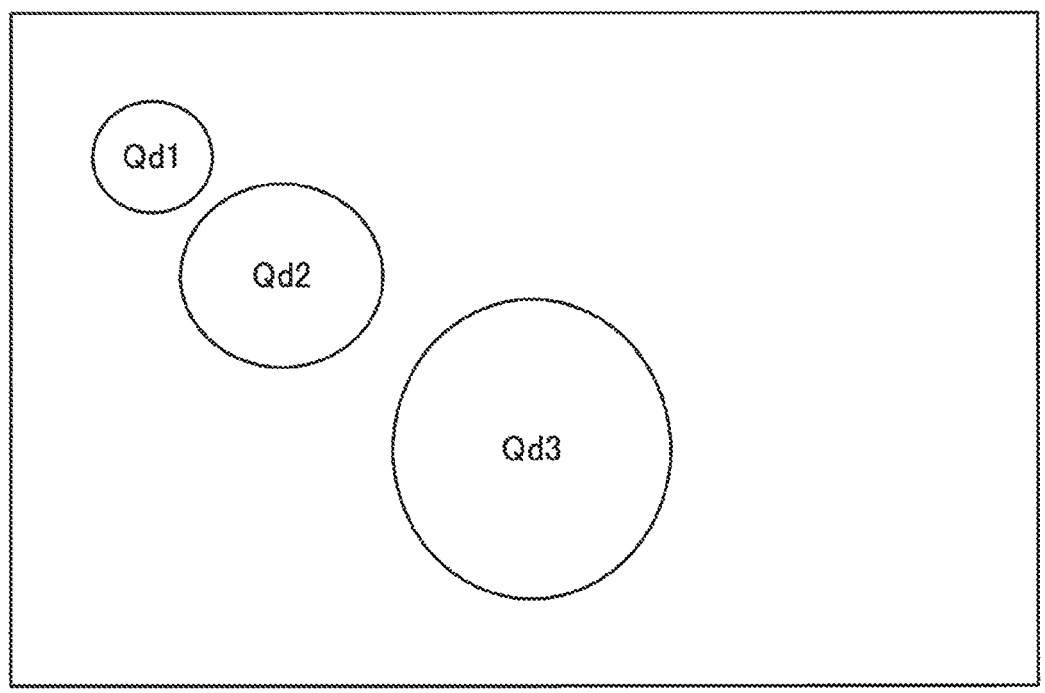
FIG. 9D is a diagram illustrating an example of a display order according to the embodiment.

FIG. 9D is a diagram illustrating an example of a display order of display items. FIG. 9D illustrate a view of the user U1. The user U1 is more likely to feel annoyance as a ratio of the display area occupying a user view 60d is larger. Accordingly, the display control unit 5032 may perform display control for first erasing a display item Qd3 having a larger display area of the display item and erasing the display in the order of display items Qd2 and Qd1.

FIG. 9E is a diagram illustrating an example of a display order of display items. FIG. 9E illustrates a view of the user U1. An obstacle QeX exists in a user view 60e. At this time, as a ratio of the display area of the display item occupying the obstacle QeX is larger, the user U1 is more difficult to recognize the obstacle and easily feels annoyance. Accordingly, the display control unit 5032 may perform display control for erasing the display item first as the display area of the display item is the display item having a larger area overlapping the area of the obstacle QeX when the user U1 starts walking. Here, when the user U1 starts walking, control for erasing the display items in the order of the display items Qe3, Qe2, and Qe1 may be performed.

In addition, as an example of the display order, the display order of the display items localized and arranged in the user U1 is lower than the order of the display items localized and arranged in the real space. The display items localized and arranged in the user U1 can be, for example, display items that are not display items displayed corresponding to the building, the road, or the like in the real space.

Specifically, the display item that is localized and arranged in the user U1 indicates a display such as time. On the other hand, the display items that are localized and arranged in the real space can indicate the display items related to the building and the like. Since it is highly likely that the user U1 has already recognized the building for the display item localized in the building, the user easily predicts an object in the real space hidden by the display item even if the display item corresponding to the building exists. Therefore, the degree of influence of the display item on the view of the user is small. However, the display item localized in the user U1 often has no object in the real space corresponding to the display item. In this case, the display item localized in the user U1 may hide the object in the real space, and the user may not recognize the object in the real space. Therefore, when the user U1 starts walking, the display control unit 5032 may first erase a display item localized in a head of the user. This makes it possible to control the presence or absence of a display item with less influence on the view of the user.

In addition, as an example of the display order, the display order may be lower in a display item that is present in an area where the difference in the scenery is larger. The difference in the scenery represents the amount of image change in an area where the display item is displayed within a predetermined time. If the difference in the scenery is large, it is highly likely that a new object exists in the scenery, and it is highly likely that the user will have difficulty in recognizing the new object. Therefore, when the user starts walking, the display items that exist in the area where the difference in the scenery is large may be first erased. This makes it possible to control the presence or absence of a display item with less influence on the view of the user.

Hereinabove, the description has been given of the variation of the display order of the display items. As described above, the display order is determined by the display position of the display item, the display area of the display item, and the view range of the user, and may be any order as long as it is generated as an order having less influence on the view of the user.

6. Modified Example

The control example of the display item described above mainly describes a case in which the user U1 starts walking or stops. However, these are merely examples, and the technology of the present disclosure is also applicable to a case in which the user U1 gets on. Here, a control example of a display item applied to the case in which the user U1 gets on will be described.

The technology of the present disclosure may be used for a windshield or a rear glass of a car. The technology of the present disclosure is more effective for a discontinuous movement change such as when the car starts and stops than for a movement change of the user in which the movement state in which the car gradually increases a speed is continuously changed.

For example, the technology of the present disclosure can be applied to a windshield when the car starts moving forward. If another car is approaching when the car starts moving forward, the erasure of the display item in a direction opposite to the approaching car is controlled. At this time, it is possible to suggest to the user the direction in which the car is approaching, and it is possible to guide the user more safely when controlling the presence or absence of the display item.

In addition, the technology of the present disclosure may be applied to a rear glass when the car in which the user rides starts moving backward. When the car starts backward, a blind spot is larger than when starting moving forward. For example, when the technology of the present disclosure is applied to the rear glass of the car, the user can intuitively grasp a distance between the obstacle and the car by erasing the display item first as the distance between the obstacle and the car is shorter. This allows the user to predict a danger of collision.

In addition, by changing the dimming degree of the display item, the user may be intuitively suggested with the danger of collision. For example, the brightness of a display item may be increased for a display item having a closer distance between the obstacle and the car. Thereby, the display item becomes brighter, so that the user's attention can be easily obtained and the display content can be easily seen. Therefore, the user can more intuitively predict the danger.

As described above, the technology of the present disclosure may be used not only when the user stops or walks, but also when the user starts moving by a car or the like.

7. Hardware Configuration Example

Figure 10:
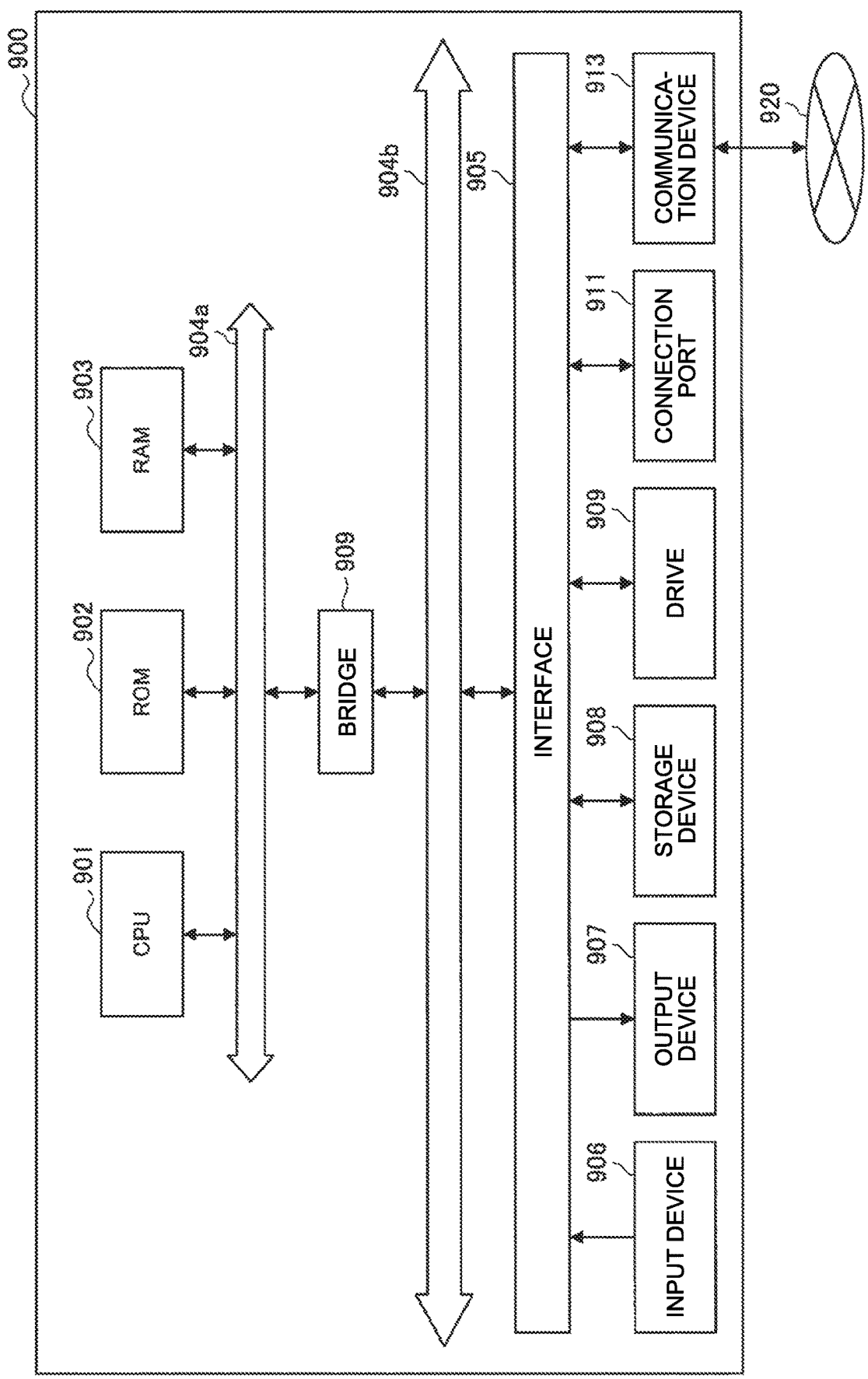
FIG. 10 is a diagram illustrating an example of a hardware configuration of the information processing system according to the embodiment.

Next, a hardware configuration example of an information processing device according to the present embodiment will be described with reference to FIG. 10. FIG. 10 is a block diagram illustrating a hardware configuration example of an information processing device according to the present embodiment. Note that an information processing device 900 illustrated in FIG. 10 can realize, for example, the information processing device 50 illustrated in FIG. 4. Information processing by the information processing device 50 according to the present embodiment is realized by cooperation between software and hardware described below.

As illustrated in FIG. 10, the information processing device 900 includes a central processing unit (CPU) 901, a read only memory (ROM) 902, a random access memory (RAM) 903, and a host bus 904a. The information processing device 900 includes a bridge 904, an external bus 904b, an interface 905, an input device 906, an output device 907, a storage device 908, a drive 909, a connection port 911, and a communication device 913. The information processing device 900 may include a processing circuit such as an electric circuit, a digital signal processor (DSP), or an application specific integrated circuit (ASIC) instead of or in addition to the CPU 901.

The CPU 901 functions as an arithmetic processing device and a control device, and controls the overall operation within the information processing device 900 according to various programs. In addition, the CPU 901 may be a microprocessor. The ROM 902 stores programs used by the CPU 901 or arithmetic parameters. The RAM 903 temporarily stores programs used in the execution of the CPU 901 and parameters that appropriately change in the execution. The CPU 901 may execute, for example, the functions of the detection unit 502 and the control unit 503 illustrated in FIG. 4.

The CPU 901, ROM 902 and RAM 903 are connected to each other by the host bus 904a including a CPU bus. The host bus 904a is connected to the external bus 904b such as a peripheral component interconnect/interface (PCI) bus via the bridge 904. Note that the host bus 904a, the bridge 904, and the external bus 904b are not necessarily configured separately, and these functions may be implemented on one bus.

The input device 906 is realized by a device to which information is input by the user, such as a mouse, a keyboard, a touch panel, a button, a microphone, a switch, and a lever. The input device 906 may be, for example, a remote control device using infrared rays or other radio waves, or may be an externally connected device such as a mobile phone or a personal digital assistant (PDA) corresponding to the operation of the information processing device 900. Furthermore, the input device 906 may include, for example, an input control circuit that generates an input signal based on information input by the user using the input means and outputs the input signal to the CPU 901. A user of the information processing device 900 can input various pieces of data and instruct a processing operation to the information processing device 900 by operating the input device 906.

The output device 907 is configured as a device that can visually or audibly notify the user of the acquired information. Such a device includes a display device such as a cathode ray tube (CRT) display device, a liquid crystal display device, a plasma display device, an electroluminescence (EL) display device, a laser projector, an LED projector, and a lamp, or a sound output device such as a speaker and a headphone. The output device 907 outputs results obtained by various pieces of processing performed by the information processing device 900, for example. Specifically, the output device 907 visually displays results obtained by various pieces of processing performed by the information processing device 900 in various formats such as text, images, tables, and graphs. On the other hand, when the sound output device is used, an audio signal including reproduced sound data or acoustic data is converted into an analog signal and is output audibly. The output device 907 can execute the function of the display device 51 illustrated in FIG. 4, for example.

The storage device 908 is a data storage device configured as an example of the storage unit of the information processing device 900. The storage device 908 is realized by, for example, a magnetic storage device such as a hard disk drive (HDD), a semiconductor storage device, an optical storage device, or a magneto-optical storage device. The storage device 908 may include a storage medium, a recording device that records data on the storage medium, a reading device that reads the data from the storage medium, a deletion device that deletes the data recorded on the storage medium, and the like. The storage device 908 stores programs or various pieces of data executed by the CPU 901, and various pieces of data acquired from the outside. The storage device 908 may execute the function of the storage unit 504 illustrated in FIG. 4, for example.

The drive 909 is a storage medium reader/writer, and is built in or externally attached to the information processing device 900. The drive 909 reads information recorded on a removable storage medium such as a mounted magnetic disk, optical disk, magneto-optical disk, or semiconductor memory, and outputs the information to the RAM 903. In addition, the drive 909 can also write the information on the removable storage medium.

The connection port 911 is an interface connected to an external device, and is a connection port with an external device capable of transmitting data by, for example, a universal serial bus (USB).

The communication device 913 is, for example, a communication interface formed by a communication device or the like for connecting to a network 920. The communication device 913 is, for example, a communication card for wired or wireless local area network (LAN), Long Term Evolution (LTE), Bluetooth (registered trademark), or a wireless USB (WUSB). In addition, the communication device 913 may be a router for optical communication, an asymmetric digital subscriber line (ADSL) router, or a modem for various communications. The communication device 913 can transmit and receive signals and the like according to a predetermined protocol such as TCP/IP, for example, between the Internet and other communication devices. The communication device 913 can execute the function of the I/F unit 501 illustrated in FIG. 4, for example.

The network 920 is a wired or wireless transmission path for information transmitted from a device connected to the network 920. For example, the network 920 may include a public line network such as the Internet, a telephone line network, a satellite communication network, various local area networks (LANs) including Ethernet (registered trademark), a wide area network (WAN), and the like. In addition, the network 920 may include a dedicated line network such as the Internet protocol-virtual private network (IP-VPN).

In addition, it is also possible to create a computer program for causing hardware such as a CPU, a ROM, and a RAM embedded in the information processing device 50 to perform the same functions as the respective components of the information processing device 50 according to the above-described embodiment. In addition, a recording medium storing the computer program is provided.

8. Summary

The embodiment of the present disclosure has been described above in detail with reference to FIGS. 1, 2, 3, 4, 5, 6, 7, 8, 9A, 9B, 9C, 9D, 9E, and 10. The information processing system 5 according to the present embodiment include the display control unit that controls the presence or absence of the display items on the display unit based on the display order of the display items determined according to the environment information or the user information, by using the change in behavior of the user as the trigger. As a result, the influence of the display item on the view of the user is reduced, and the user can comfortably experience the AR superimposition technology.

The preferred embodiments of the present disclosure have been described above in detail with reference to the accompanying drawings, but the technical scope of the present disclosure is not limited to such examples. It is obvious that a person having ordinary knowledge in the technical field of the present disclosure can arrive at various changes or modifications within the scope of the technical idea described in the claims, and it is understood that these changes or modifications also belong to the technical scope of the present disclosure.

In addition, the effects described in the present specification are merely illustrative or exemplary and are not limited. That is, the technology according to the present disclosure can exhibit other effects that are apparent to those skilled in the art from the description of the present specification in addition to or instead of the effects.

Note that the following configurations also belong to the technical scope of the present disclosure.

(1)

An information processing device comprising: a display control unit that controls the presence or absence of a display item on a display unit based on a display order of display items determined according to environment information or user information, by using a change in behavior of a user as a trigger.

(2)

The information processing device according to (1), wherein the display order is an order in which the presence or absence of the display item is controlled in time series by the display control unit.

(3)

The information processing device according to (1) or (2), wherein the display control unit displays the display items or erases the display items at different timings according to the display order.

(4)

The information processing device according to any one of (1) to (3), wherein the environment information includes at least one of luminance information, color information, sound information, and depth information of an environment around the user.

(5)

The information processing device according to any one of (1) to (4), wherein the user information includes at least one of line-of-sight and view information, posture information, and movement information of the user.

(6)

The information processing device according to any one of (1) to (6), wherein the display control unit controls the presence or absence of the display item by moving the display item inside and outside a display area of the display unit.

(7)

The information processing device according to any one of (1) to (5), wherein the display control unit controls the presence or absence of the display item by fading in and out the display item in a display area of the display unit.

(8)

The information processing device according to any one of (1) to (7), wherein the display order of the display items is determined according to a degree of influence on the view of the user.

(9)

The information processing device according to (8), wherein the degree of influence is determined based on a display position of the display item, a display area in which the display item is displayed, and a view range of the user.

(10)

The information processing device according to (9), wherein the display order of the display items is higher as an occupation ratio of the display area of the display items occupying an area of the display unit is smaller.

(11)

The information processing device according to (9), wherein the display order of the display items is higher as the display position of the display item approaches a body of the user.

(12)

The information processing device according to (9), wherein the display order of the display items is lower as the display position of the display items is closer to the feet of the user.

(13)

The information processing device according to (9), wherein the display order of the display items is lower as the display position of the display item is closer to a straight line toward a moving direction of the user with the user as a starting point.

(14)

The information processing device according to (9), wherein the display order of the display items is lower as a ratio of the display area of the display item overlapping an obstacle area existing in a real space is larger.

(15)

The information processing device according to (8), wherein in the display order of the display items, an order of the display items localized and arranged in the user is lower than that of the display items localized and arranged in a real space in the display unit.

(16)

The information processing device according to any one of (1) to (15), wherein the display control unit releases control of the display item when the user detects a cancel operation.

(17)

The information processing device according to (16), wherein the cancel operation includes at least one of a gesture or a sound.

(18)

The information processing device according to (1) or (5), wherein the display control unit controls the presence or absence of the display item according to a movement state of the user.

(19)

An information processing method comprising: controlling, by a processor, the presence or absence of a display item on a display unit based on a display order of display items determined according to environment information or user information, by using a change in behavior of a user as a trigger.

(20)

A program that causes a computer to function as: a display control unit that controls the presence or absence of a display item on a display unit based on a display order of display items determined according to environment information or user information, by using a change in behavior of a user as a trigger.

REFERENCE SIGNS LIST

50 INFORMATION PROCESSING DEVICE
51 DISPLAY DEVICE
52 SENSOR DEVICE
502 DETECTION UNIT
503 CONTROL UNIT
5021 USER POSITION INFORMATION DETECTION UNIT
5022 USER OPERATION INFORMATION DETECTION UNIT
5023 TRIGGER DETECTION UNIT
5024 ENVIRONMENT INFORMATION ACQUISITION UNIT
503 CONTROL UNIT
5031 DISPLAY ORDER GENERATION UNIT
5032 DISPLAY CONTROL UNIT

The invention claimed is:

1. An information processing device, comprising:
  circuitry configured to:
    determine a display order of a plurality of display items based on environment information and user information, wherein
      the user information includes at least one of posture information of a user or movement information of the user, and
      the movement information indicates at least one of a moving direction of the user or a moving speed of the user;
    detect, as a trigger, a change in a behavior of the user; and
    control one of a presence or an absence of a first display item of the plurality of display items on a display screen, based on the display order of the plurality of display items and the trigger.

2. The information processing device according to claim 1, wherein the circuitry is further configured to control, based on the display order, the one of the presence or the absence of the first display item in time series.

3. The information processing device according to claim 2, wherein the circuitry is further configured to control, based on the display order, one of:
  display of the plurality of display items on the display screen at different timings, or
  erasure of the plurality of display items on the display screen at different timings.

4. The information processing device according to claim 1, wherein the environment information includes at least one of luminance information, color information, sound information, or depth information of an environment around the user.

5. The information processing device according to claim 1, wherein the user information further includes line-of-sight and view information of the user.

6. The information processing device according to claim 1, wherein the circuitry is further configured to control the one of the presence or the absence of the first display item based on a movement of the first display item inside and outside a display area of the display screen.

7. The information processing device according to claim 1, wherein the circuitry is further configured to control the one of the presence or the absence of the first display item based on one of fade in or fade out of the first display item in a display area of the display screen.

8. The information processing device according to claim 3, wherein the circuitry is further configured to determine the display order of the plurality of display items based on a degree of influence of the first display item on a view of the user.

9. The information processing device according to claim 8, wherein the circuitry is further configured to determine the degree of influence of the first display item based on a display position of the first display item, a display area of the first display item, and a view range of the user.

10. The information processing device according to claim 9, wherein the first display item is before a second display item of the plurality of display items in the display order based on an occupation ratio of the display area of the first display item that is smaller than an occupation ratio of a display area of the second display item.

11. The information processing device according to claim 9, wherein the first display item is before a second display item of the plurality of display items in the display order based on the display position of the first display item that is closer to a body of the user than a display position of the second display item.

12. The information processing device according to claim 9, wherein the first display item is after a second display item of the plurality of display items in the display order based on the display position of the first display item that is closer to feet of the user than a display position of the second display item.

13. The information processing device according to claim 9, wherein
  the first display item is after a second display item of the plurality of display items in the display order based on the display position of the first display item that is closer to a straight line than a display position of the second display item, and
  the straight line is toward the moving direction of the user with the user as a starting point.

14. The information processing device according to claim 9, wherein
  the first display item is after a second display item of the plurality of display items in the display order based on a ratio of the display area of the first display item that overlaps an obstacle area existing in a real space, and
  the ratio of the display area of the first display item is larger than a ratio of a display area of the second display item that overlaps the obstacle area.

15. The information processing device according to claim 8, wherein
  the first display item is after a second display item of the plurality of display items in the display order,
  the first display item does not correspond to an object in a real space, and
  the second display item corresponds to the object in the real space.

16. The information processing device according to claim 1, wherein the circuitry is further configured to release the control of the one of the presence or the absence the first display item based on a cancel operation associated with the user.

17. The information processing device according to claim 16, wherein the cancel operation includes at least one of a gesture of the user or a sound by the user.

18. The information processing device according to claim 5, wherein the circuitry is further configured to control the one of the presence or the absence of the first display item based on a movement state of the user.

19. An information processing method, comprising:
 determining, by a processor, a display order of a plurality of display items based on environment information and user information, wherein
  the user information includes at least one of posture information of a user or movement information of the user, and
  the movement information indicates at least one of a moving direction of the user or a moving speed of the user;
 detecting, by the processor, a change in a behavior of the user as a trigger; and
 controlling, by the processor, one of a presence or an absence of a first display item of the plurality of display items on a display screen, based on the display order of the plurality of display items and the trigger.

20. A non-transitory computer-readable medium having stored thereon computer-executable instructions which, when executed by a computer, cause the computer to execute operations, the operations comprising:
 determining a display order of a plurality of display items based on environment information and user information, wherein
  the user information includes at least one of posture information of a user or movement information of the user, and
  the movement information indicates at least one of a moving direction of the user or a moving speed of the user;
 detecting, as a trigger, a change in a behavior of the user; and
 controlling one of a presence or an absence of a first display item of the plurality of display items on a display screen, based on the display order of the plurality of display items and the trigger.

21. An information processing device, comprising:
 circuitry configured to:
  determine a degree of influence of a display item of a plurality of display items on a view of a user, based on a display position of the display item, a display area of the display item, and a view range of the user;
  determine a display order of the plurality of display items based on the degree of influence and at least one of environment information or user information;
  detect, as a trigger, a change in a behavior of the user; and
  control, based on the display order of the plurality of display items and the trigger, one of:
   display of the plurality of display items on a display screen at different timings, or
   erasure of the plurality of display items on the display screen at different timings.

* * * * *